March 31, 1942.   L. E. SHUMAKER   2,277,889
LAND LEVELING MACHINE
Filed Sept. 12, 1940   4 Sheets-Sheet 1
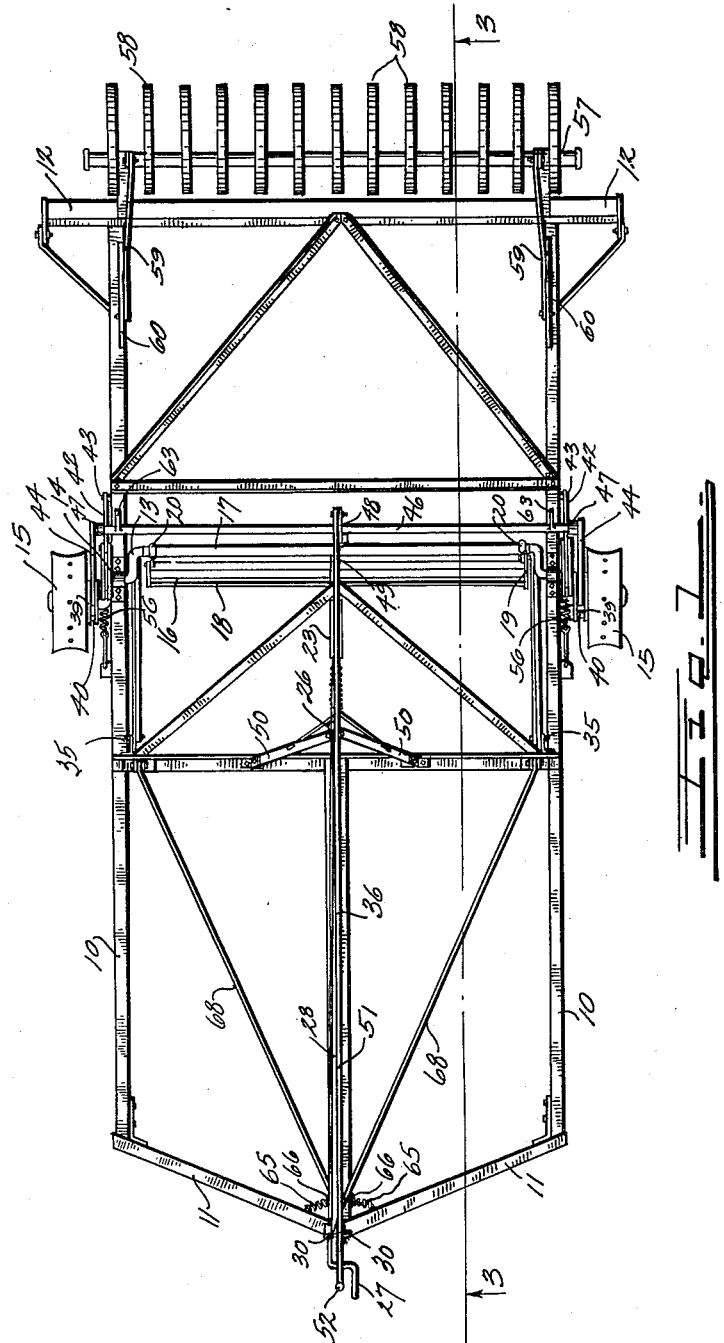
INVENTOR.
LAWRENCE E. SHUMAKER
BY

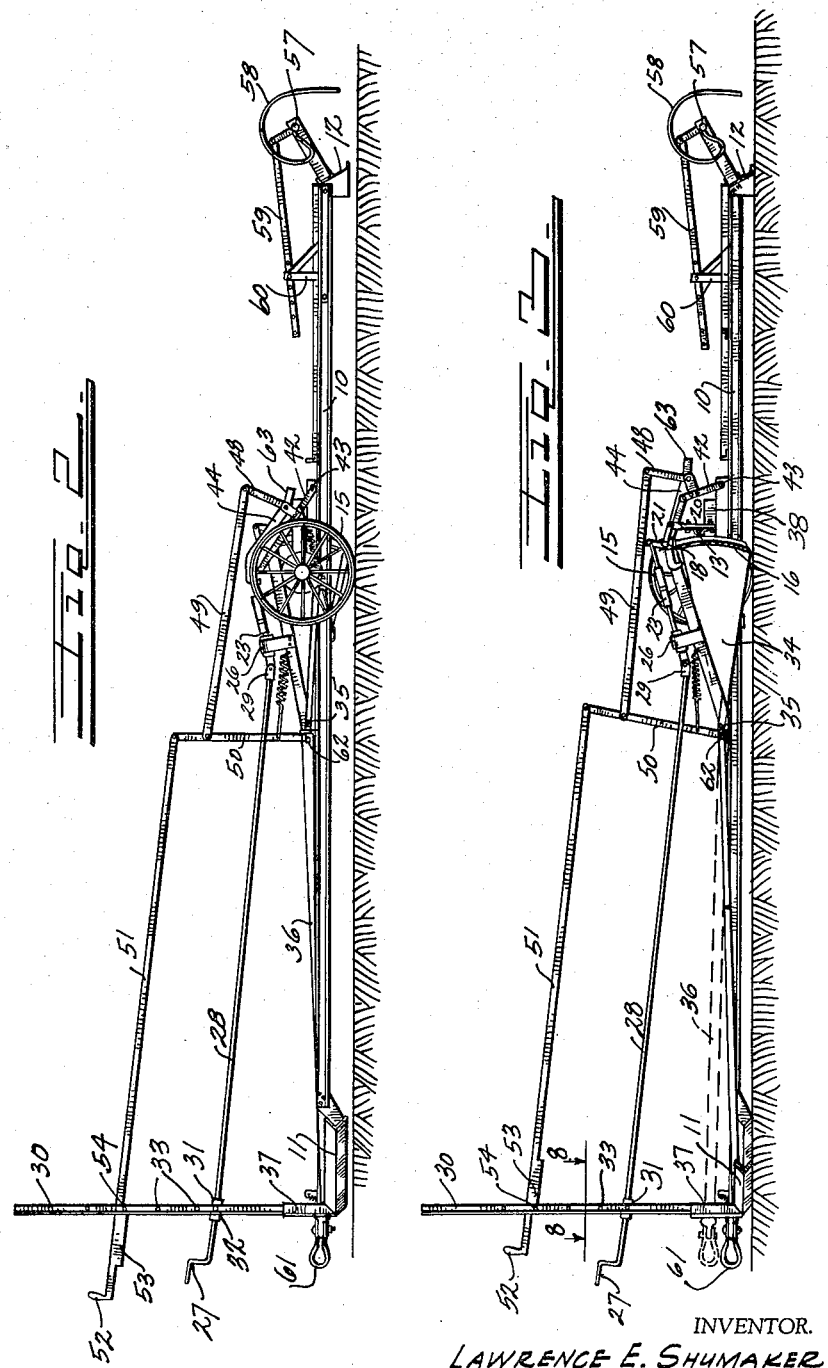

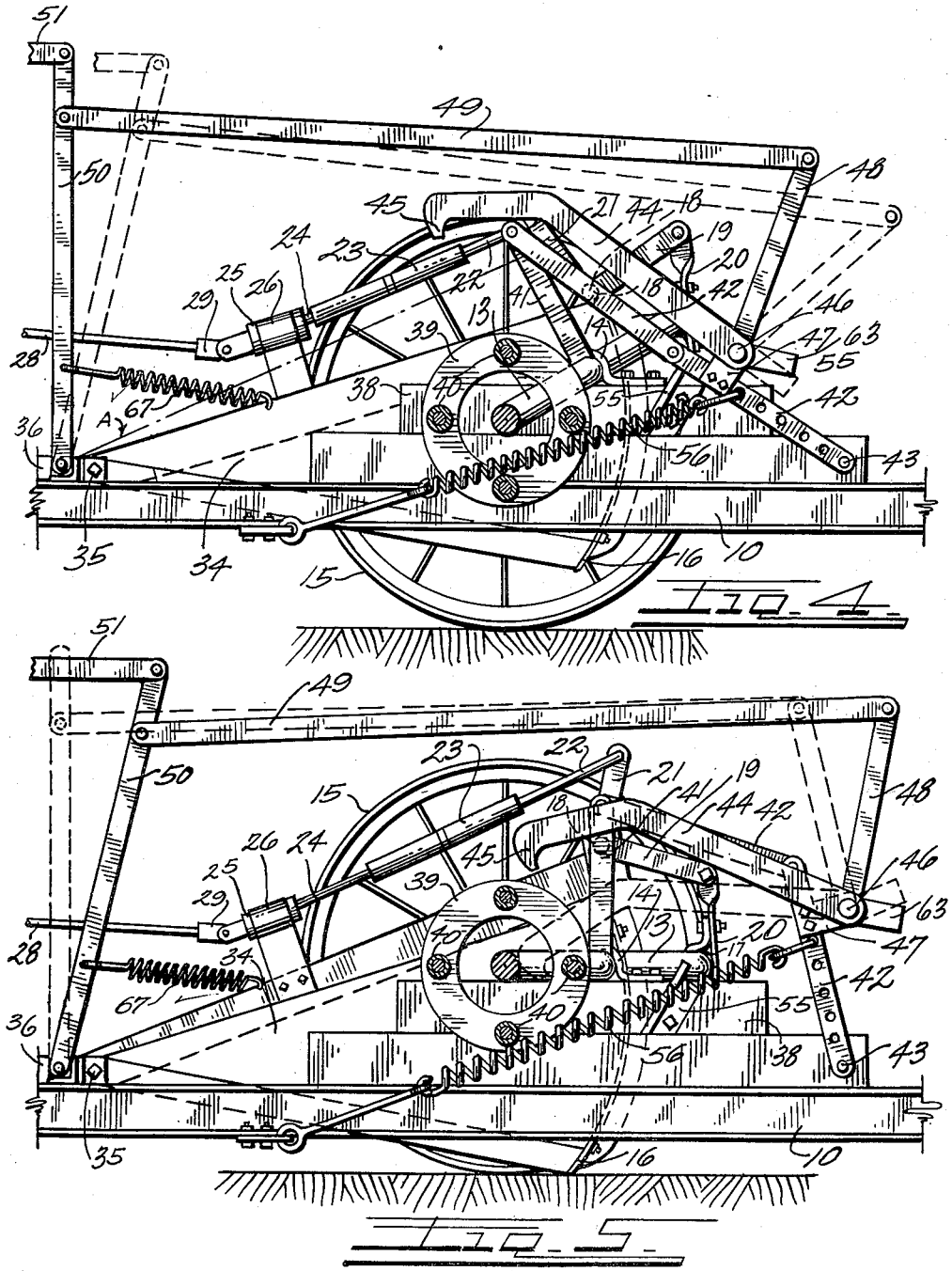

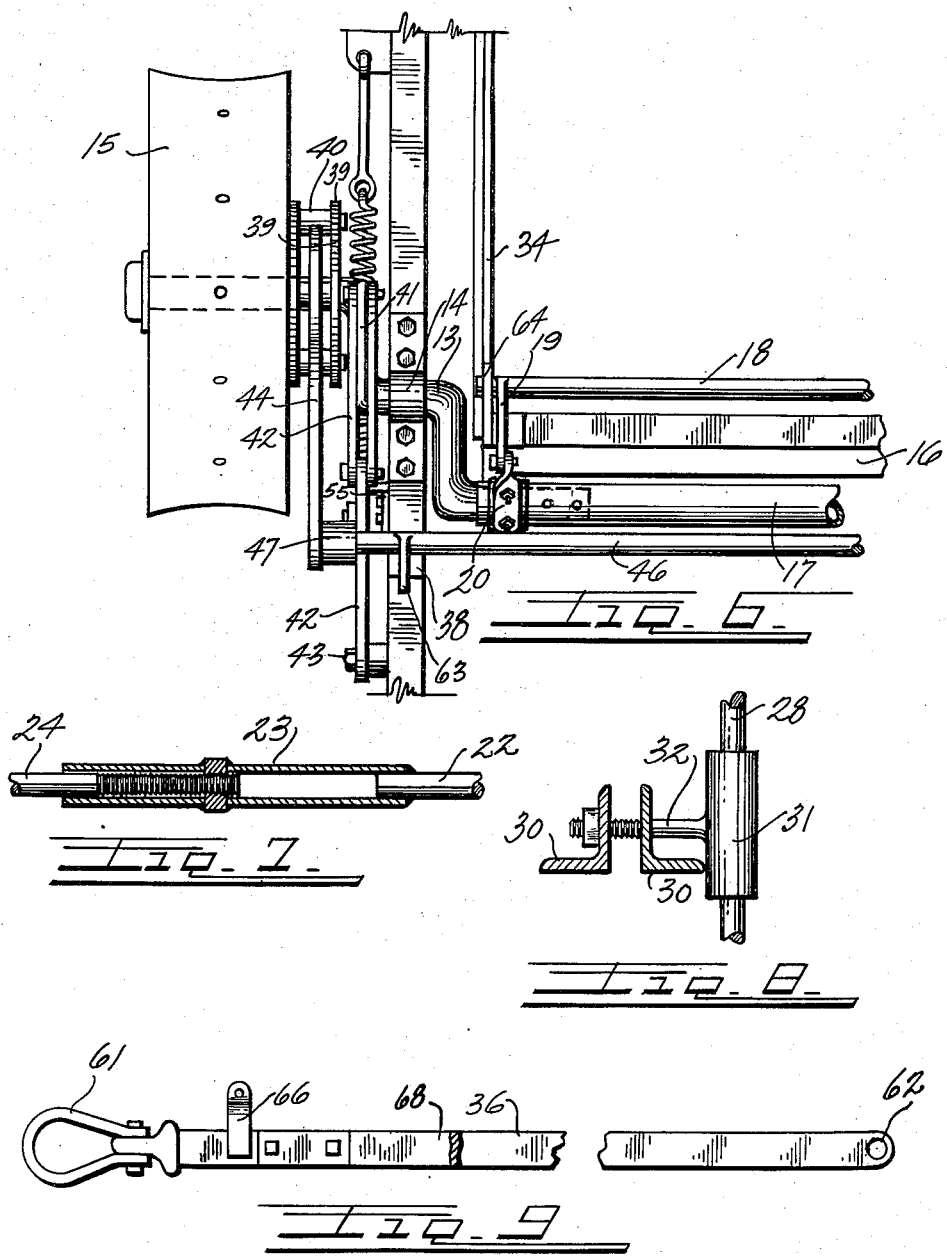

Patented Mar. 31, 1942

2,277,889

UNITED STATES PATENT OFFICE 2,277,889

LAND LEVELING MACHINE

Lawrence E. Shumaker, Denver, Colo., assignor to Eversman Mfg. Co., Denver, Colo.

Application September 12, 1940, Serial No. 356,464

9 Claims. (Cl. 37—169)

This invention relates to a land leveling machine, and has for its principal object the provision of a device which can be drawn over uneven land and which will automatically cut away the high places and fill in the low places to bring the land to a perfect level condition.

Other objects of the invention are: to provide a land leveler which can be used for earth moving so that the operator can gather earth wherever desired, and dump the latter wherever desired; to provide a machine of this type which can be controlled entirely by the operator of a towing tractor without requiring an additional operator on the leveling machine to provide means for harrowing or breaking the soil simultaneously with the leveling operation; and to provide a land leveler which will not be effected by vertical movements of the tractor.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is plan view of the complete land leveling machine.

Fig. 2 is a side view thereof in the raised or inoperative position.

Fig. 3 is longitudinal section through the machine in the lowered or operating position. This view is taken on the line 3—3, Fig. 1.

Fig. 4 is an enlarged detail section, taken on the line 4—4, Fig. 1, illustrating the scraper blade in the elevated position or dumping position.

Fig. 5 is a similar view illustrating the scraper blade in the lowered or scraping position.

Fig. 6 is an enlarged fragmentary plan view of the crank axle employed in the device.

Fig. 7 is a detail view of the blade adjusting mechanism.

Fig. 8 is a detail enlarged section, taken on the line 8—8, Fig. 3, illustrating the control shaft bearing.

Fig. 9 is a detail view of the tongue employed for drawing the leveler over the ground.

The improved land leveler comprises a main frame 10, having an angular prow-pointed drag 11, at its forward extremity and a curved drag plate 12 at its rearward extremity. The lower edges of the drag 11 and the plate 12 are in perfect horizontal alignment with each other. An axle crank member 13 is pivotally mounted at each side of the frame 10, at approximately the middle balance points thereof. The axle cranks are mounted in bearings 14 on the side members of the frame 10, and extend forwardly, downwardly, and outwardly from the bearings on the outside of the frame to form axle shafts for a pair of ground engaging wheels 15. They also extend rearwardly and upwardly from the bearings 14, on the inside of the frame where they are joined by a tube 17 which is fixedly secured thereto and which extends completely across the frame to support a scraper blade 16 therein. The scraper blade 16 is provided with side members 34, which extend forwardly to pivots 35, supported by the frame 10. A depth adjusting shaft 18 is journalled along the upper edge of the blade 16 in journal arms 64 and is provided at each extremity with a bracket arm 19 from which attachment clips 20 are suspended to hingedly engage the tube 17.

It can be readily seen that if the shaft 18 is prevented from rotating the entire blade will be raised and lowered by the crank axle inversely as the wheels 15 raise and lower. The shaft 18 is prevented from rotating by means of a depth adjusting arm 21, extending from its middle portion. This arm is connected by means of a connecting link 22, with an internally threaded nut sleeve 23. A threaded, rotatable, adjusting rod 24 is threaded into the nut sleeve, as shown in Fig. 7. The rod 24 is prevented from moving longitudinally by means of set collars 25, which act against a supporting bracket 26. It can be seen that if the rod 24 is rotated in one direction it will swing the arm 21 forward and if rotated in the other direction will swing the arm rearward. The movements of the arm are communicated through the bracket arms 19 to the scraper blade to raise or lower the latter to the proper adjusted position in relation to the crank axle.

The rod 24 is rotated through the medium of a crank 27 positioned adjacent the forward extremity of the leveler on an adjusting rod 28. The adjusting rod is connected with the rod 24 through the medium of a universal joint 29. The forward extremity of the crank shaft is supported from a pair of parallel, spaced-apart, vertical standards 30, extending upwardly from the middle of the forward drag 11, through the medium of a pivoted bearing 31. The bearing 31 is provided with a stud 32 which can be positioned in any one of a series of holes 33, in the standards 30 so as to place the crank 27 within convenient reach of the tractor operator.

The frame 10 is designed to be drawn by means of a tongue member 36 which is hinged at 62, approximately at the middle of the frame 10. The forward extremity of the tongue member is provided with a loop 61 by means of which it can be attached to the draw bar of a tractor. Sideward movement of the tongue member is prevented by means of spaced-apart, vertical angle guides 37, at the front of the frame and by diagonal tongue braces 68 which are hinged to the frame 10.

As thus far described, the device provides a complete automatic land leveler. In use, the operator rotates the crank 27 to bring the scraper blade to the ground level, he then draws the leveler over the ground. If the wheels 15 sink into a depression, they act to rotate the crank axle 13 so as to raise the scraper blade to deposit earth in the depression. If the wheels ride over an elevation, they will similarly lower the scraper blade to scrape away the elevation so as to automatically level the field.

For dirt moving purposes, means are provided to enable the operator to raise and lower the scraper blade 16 whenever he desires. This is accomplished by placing annular roller rings 39 on each wheel. These rings carry a series of spaced-apart rollers 40. A lever 41 is extended upwardly from adjacent each extremity of the crank axle 13. Each of these levers is connected, by means of a pair of toggle links 42, with rearwardly positioned, fixed pivots 43 on the frame 10.

When the two toggle links are brought into alignment the levers 41 are forced forwardly to cause the crank axle to push downwardly on the wheels 15, which results in raising the entire frame including the scraper blade to the position of Fig. 4. When the toggle links are broken to the position of Fig. 5, the levers 41 move rearwardly lowering both the frame and the scraper blade.

The raising movement of the toggle levers is accomplished by means of hooked arms 44 which terminate at their forward extremities in hooks 45 which can be brought into engagement with the rollers 40. One of the hooked arms 44 is secured on each extremity of an arm shaft 46 and the latter is journaled in suitable journal brackets 47 secured to the lowermost toggle links 42. The shaft 46 can be rotated to swing the arms 44 through the medium of an operating lever 48 which is connected by means of a connecting rod 49 with a rocking lever 50 at the middle of the frame 10. The rocking lever 50 is in turn connected to a pull bar 51 extending forwardly between the standards 30 and terminating in a hand grip 52.

The hand grip 52 is positioned within convenient reach of the operator and is provided with a stop boss 53 which holds it in either the forward or rearward position. The bar 51 rests on a cross bolt 54 extended between the standards 30. The position of this bolt can be changed in the holes 33 to elevate the hand grip 52 to any convenient position.

Let us assume that the blade and frame are in the position of Fig. 5 and that the operator desires to raise the blade to dump a load of earth. He grasps the handle 52 and pulls the bar 51 forwardly to the broken line position of Fig. 5 until the boss 53 is ahead of the bolt 54. This rotates the shaft 46 forwardly causing the hooked arms 44 to swing downwardly. The hooks on these arms are then engaged by the revolving rollers 40 and the arms are pulled forward as the wheels rotate. This forward pulling action serves to bring the two toggle links 42 into alignment, as shown in Fig. 4 and causes the entire frame to elevate.

A stop member is positioned to be engaged by the toggle links 42 as they pass the dead center of the aligned position. This prevents them from moving further forward and acts to lock the toggle links in the extended position. When this position is reached the succeeding rollers strike the hooked arms 44 lifting them out of engagement with the rollers.

To break the arms and drop the frame, the bar 51 is lifted to release the boss 53 from the bolt 54. It is then pushed rearwardly to the broken line position of Fig. 4. This rotates the shaft 46 rearwardly. This shaft is provided with a pair of prying arms 63. These arms swing downward and pry against the end of a bearing supporting member 38 which acts as an abutment or fulcrum for the prying arms 63. This prying action serves to break the locked toggle links to drop the entire frame and blade to the position of Fig. 5.

A tension spring 56 is stretched between the lowermost links 42 and the frame 10 to act to constantly urge the toggle links to the extended position. These springs therefore act as counterweights to support a portion of the weight of the frame 10 so as to reduce the effort required in the lifting operation.

It can be readily seen from the above that the operator can drop the blade at any desired point and can cause the wheels to lift the blade wherever it is desired to deposit a load.

A harrow shaft 57 is pivotally mounted above the rear of the frame 10. This shaft carries a series of spring harrow teeth 58 which can, if desired, be brought into engagement with the ground to break up the clods on the surface thereof. The teeth are raised or lowered by an adjusting bar 59 which can be set in any desired position in a bar bracket 60 on the frame 10.

The tongue member 36 is constantly pulled downward by means of tongue springs 65 which extend from the frame 10 to spring brackets 66 on the tongue. These springs act to relieve the load on the front of the leveler and prevent the front drag from digging into the ground surface. The rocking lever 50 is constantly pulled rearwardly by means of a tension spring 67 which normally supports the weight of the hooked levers 44.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A land leveler comprising: an open horizontally positioned frame; leveling drags at the front and rear of said frame; ground engaging wheels at each side of said frame; a crank axle extending from each wheel rearwardly and upwardly to a pivot on said frame, thence continuing rearwardly and upwardly within said frame, thence connected across said frame; a scraper blade extending across said frame parallel to the midportion of said axle; means for pivotally mounting said blade in said frame forwardly of said axle, an adjustable connection between said axle and said blade; toggle links for swinging said crank axle to lift said frame and blade; an annular series of rotating members revolved by said wheels; and a hooked member pivotally mounted on said toggle links for temporarily engaging said rotating members to actuate said toggle links.

2. A land leveler comprising: an open horizontally positioned frame; leveling drags at the front and rear of said frame; ground engaging wheels at each side of said frame; a crank axle extending from each wheel rearwardly and upwardly to a pivot on said frame, thence continuing rearwardly and upwardly within said frame, thence connected across said frame; a scraper blade extending across said frame parallel to the midportion of said axle; means for pivotally mounting said blade in said frame forwardly of said axle; an adjustable connection between said axle and said blade; toggle links for swinging said crank axle to lift said frame and blade; an annular series of rotating members revolved by said wheels; a hooked member pivotally mounted on said toggle links for temporarily engaging said rotating members to actuate said toggle links; and an operating rod extending to a position forwardly of said frame for bringing said hooked members into engagement with said rotating members when desired.

3. A land leveler comprising: an open horizontally positioned frame; leveling drags at the front and rear of said frame; ground engaging wheels at each side of said frame; a crank axle extending from each wheel rearwardly and upwardly to a pivot on said frame, thence continuing rearwardly and upwardly within said frame, thence connected across said frame; a scraper blade extending across said frame parallel to the midportion of said axle; means for pivotally mounting said blade in said frame forwardly of said axle; an adjustable connection between said axle and said blade; toggle links for swinging said crank axle to lift said frame and blade; an annular series of rotating members revolved by said wheels; a hooked member pivotally mounted on said toggle links for temporarily engaging said rotating members to actuate said toggle links; fulcrum levers projecting from said hooked members; and means on said frame to be engaged by said fulcrum members when said hooked members are swung to the unhooked position to collapse said toggle links.

4. A land leveler comprising: an open horizontally positioned frame; leveling drags at the front and rear of said frame; ground engaging wheels at each side of said frame; a crank axle extending from each wheel rearwardly and upwardly to a pivot on said frame, thence continuing rearwardly and upwardly within said frame, thence connected across said frame; a scraper blade extending across said frame parallel to the midportion of said axle; means for pivotally mounting said blade in said frame forwardly of said axle; an adjustable connection between said axle and said blade; toggle links for swinging said crank axle to lift said frame and blade; an annular series of rotating members revolved by said wheels; a hooked member pivotally mounted on said toggle links for temporarily engaging said rotating members to actuate said toggle links; and means for adjustably and slidably supporting the forward extremity of said operating rod at any desired height on said frame.

5. A land leveler comprising: an open horizontally positioned frame; leveling drags at the front and rear of said frame; ground engaging wheels at each side of said frame; a crank axle extending from each wheel rearwardly and upwardly to a pivot on said frame, thence continuing rearwardly and upwardly within said frame, thence connected across said frame; a scraper blade extending across said frame parallel to the midportion of said axle; means for pivotally mounting said blade in said frame forwardly of said axle; an adjustable connection between said axle and said blade; toggle links for swinging said crank axle to lift said frame and blade; an annular series of rotating members revolved by said wheels; a hooked member pivotally mounted on said toggle links for temporarily engaging said rotating members to actuate said toggle links; an operating rod extending to a position forwardly of said frame for bringing said hooked members into engagement with said rotating members when desired; and releasable means for locking said operating rod in either its forward or rearward position.

6. A land leveler comprising: an open horizontally positioned frame; leveling drags at the front and rear of said frame; ground engaging wheels at each side of said frame; a crank axle extending from each wheel rearwardly and upwardly to a pivot on said frame, thence continuing rearwardly and upwardly within said frame, thence connected across said frame; a scraper blade extending across said frame parallel to the mid-portion of said axle; means for pivotally mounting said blade in said frame forwardly of said axle; means for suspending said blade from the mid-portion of said axle; a pair of toggle links hinged to said frame at each side thereof and rearwardly of said axle, the uppermost link of each pair being hingedly connected to the midportion of said axle so that when said links are aligned said mid-portion will be forced upward to raise said frame; an arm shaft journalled on and extending between the lowermost link of each pair of toggle links; a hooked arm extending from each extremity of said arm shaft; means on said wheels engageable by said hooked arms; and means on said arm shaft for rotating the latter to engage said hooked arms to cause said wheels to bring said toggle links to alignment.

7. A land leveler comprising: an open horizontally positioned frame; leveling drags at the front and rear of said frame; ground engaging wheels at each side of said frame; a crank axle extending from each wheel rearwardly and upwardly to a pivot on said frame, thence continuing rearwardly and upwardly within said frame, thence connected across said frame; a scraper blade extending across said frame parallel to the mid-portion of said axle; means for pivotally mounting said blade in said frame forwardly of said axle; means for suspending said blade from the mid-portion of said axle; a pair of toggle links hinged to said frame at each side thereof and rearwardly of said axle, the uppermost link of each pair being hingedly connected to the mid-portion of said axle so that when said links are aligned said mid-portion will be forced upward to raise said frame; an arm shaft journalled on and extending between the lowermost link of each pair of toggle links; a hooked arm extending from each extremity of said arm shaft; means on said wheels engageable by said hooked arms; means on said arm shaft for rotating the latter to engage said hooked arms to cause said wheels to bring said toggle links to alignment; a fulcrum lever projecting from said arm shaft; and a fulcrum member on said frame to be engaged by said fulcrum lever to pry said toggle links from the aligned position.

8. In a ground working machine of the type having a frame, an axle extending across the frame and provided with crank extremities upon which ground engaging wheels are carried whereby when said axle is rotated said frame will be raised and lowered in relation to said wheels, means for rotating said axle from the movement of said wheels comprising: a lever fixed to and extending from said axle; a pair of joined toggle levers extending from said lever to said frame; an annular series of rotating members revolved by said wheels; and a hooked member pivotally mounted on said toggle links for temporarily engaging said rotating members to actuate said toggle links.

9. In a ground working machine of the type having a frame, an axle extending across the frame and provided with crank extremities upon which ground engaging wheels are carried whereby when said axle is rotated said frame will be raised and lowered in relation to said wheels, means for rotating said axle from the movement of said wheels comprising: a lever fixed to and extending from said axle; a pair of joined toggle levers extending from said lever to said frame; an annular series of rotating members revolved by said wheels; a hooked member pivotally mounted on said toggle links for temporarily engaging said rotating members to actuate said toggle links; and an operating rod extending to a position forward on said frame for bringing said hooked member into engagement with said rotating members when desired.

LAWRENCE E. SHUMAKER.